Figure 1:
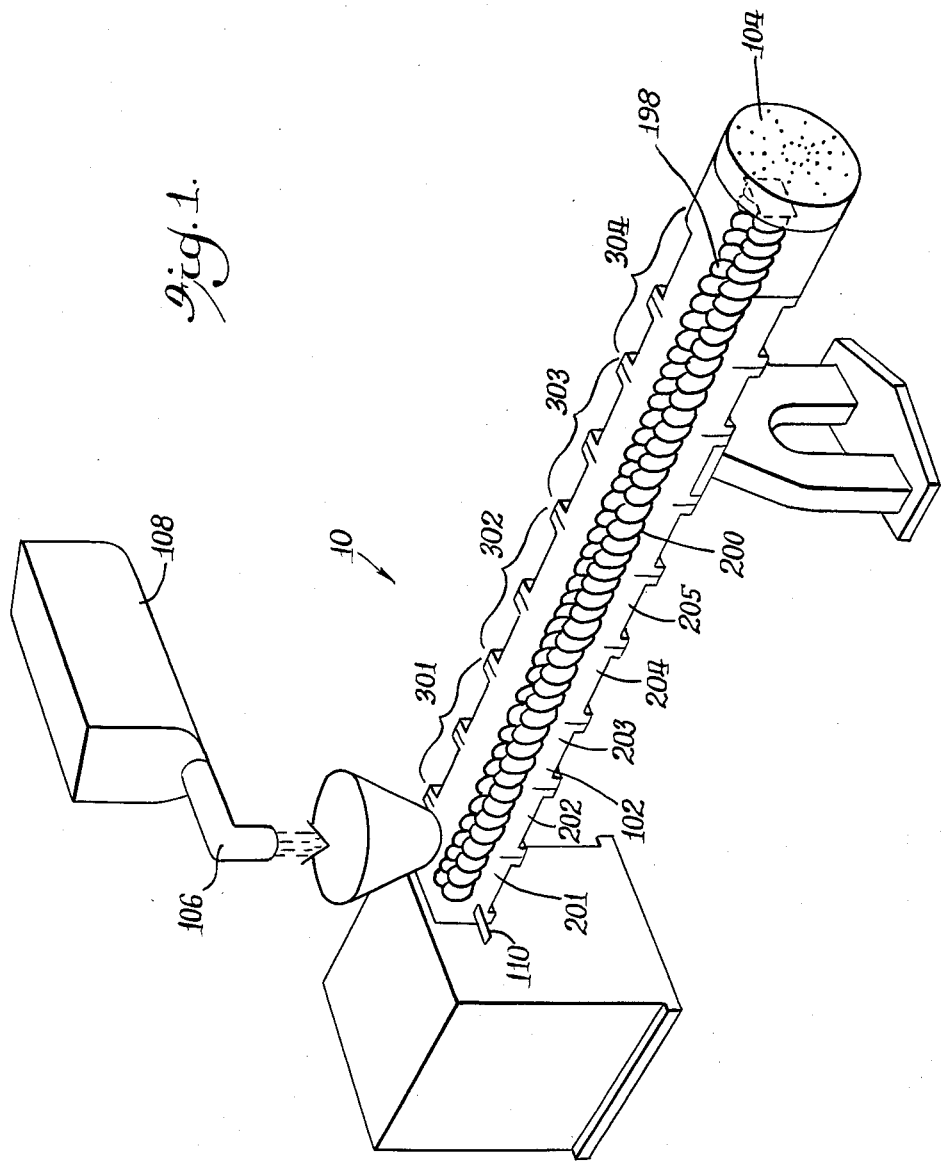

United States Patent [19]

Myer et al.

[11] Patent Number: 4,540,592

[45] Date of Patent: Sep. 10, 1985

[54] MULTIPLE SCREW PASTA MANUFACTURING PROCESS

[75] Inventors: William J. Myer, Prospect Heights; Reid G. Lamppa, Streamwood, both of Ill.

[73] Assignee: Kraft, Inc., Glenview, Ill.

[21] Appl. No.: 566,589

[22] Filed: Dec. 27, 1983

[51] Int. Cl.³ ............................................... A23L 1/16
[52] U.S. Cl. .................................... 426/557; 426/451; 426/558; 426/516
[58] Field of Search ............... 426/557, 451, 510, 511, 426/516, 558

[56] References Cited

U.S. PATENT DOCUMENTS

| 1,883,653 | 10/1932 | Epstein et al. | 426/558 |
| 3,162,536 | 12/1964 | Kaufmann | 426/557 |
| 3,458,321 | 7/1969 | Reinhart | 99/85 |
| 3,762,931 | 10/1973 | Craig et al. | 426/557 |
| 4,044,165 | 8/1977 | Baumann | 426/557 |
| 4,243,689 | 1/1981 | Kokeguchi et al. | 426/451 |
| 4,394,397 | 7/1983 | Lometillo et al. | 426/557 |
| 4,423,082 | 12/1983 | Bauernfeind et al. | 426/557 |

Primary Examiner—Raymond Jones
Assistant Examiner—Marianne S. Minnick
Attorney, Agent, or Firm—Fitch, Even, Tabin & Flannery

[57] ABSTRACT

Methods for preparing a precooked pasta product utilizing a twin screw extruder and subjecting the pasta component to substantial backmixing at elevated pressure and temperature prior to cooling and extrusion.

9 Claims, 3 Drawing Figures

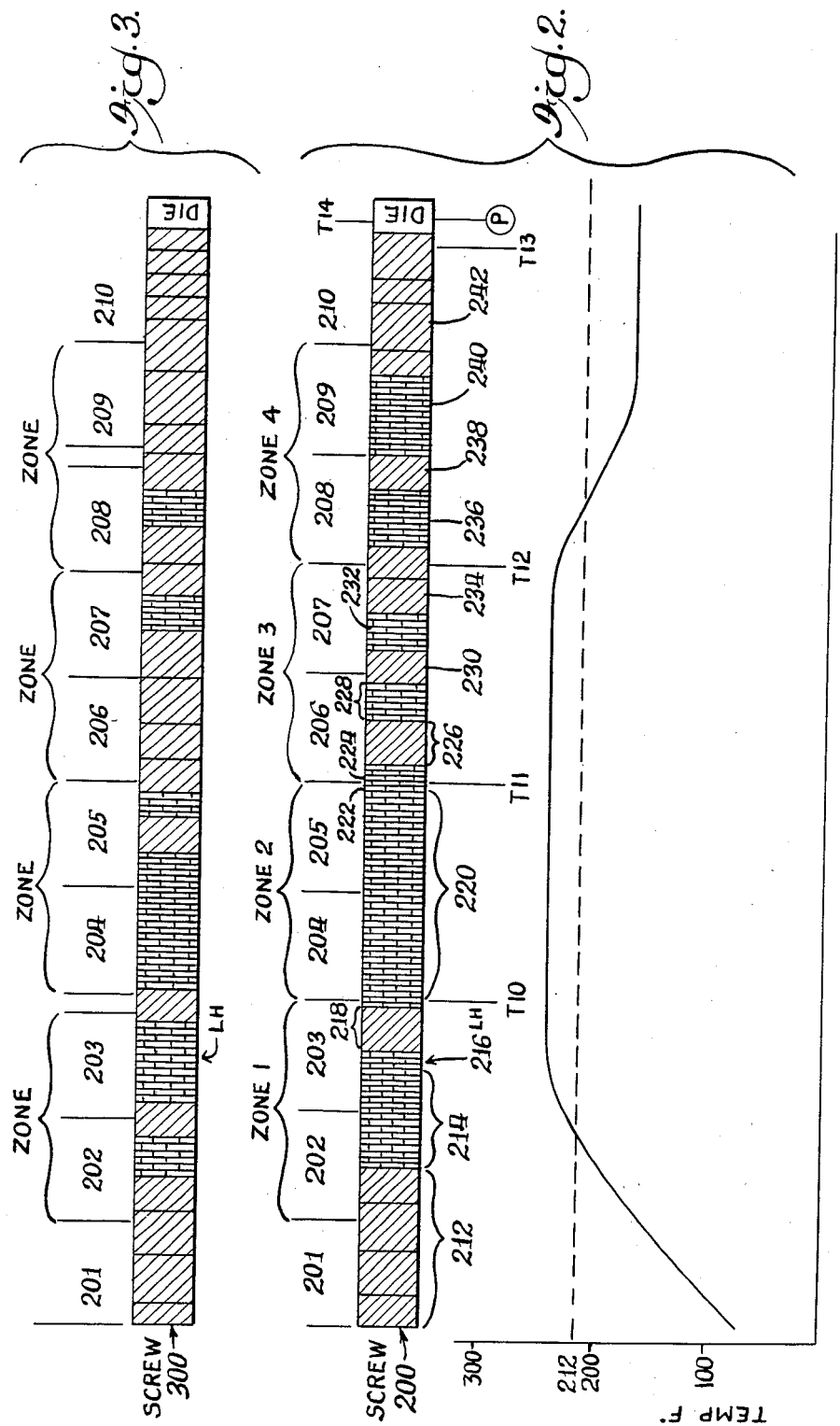

MULTIPLE SCREW PASTA MANUFACTURING PROCESS

The present invention relates to methods for manufacturing alimentary paste type products, or pasta, such as macaroni, spaghetti, vermicelli, noodles and the like, and more particularly, methods for continuous manufacture of such precooked pasta products which may be readily rehydrated.

Conventional pasta products are manufactured by extrusion of an uncooked, aqueous flour paste into desired shapes, and subsequent air drying of the extrusion formed products for an extended period of time to provide a dried, uniform product without stress cracks or other defects. Such conventional pasta products require extensive cooking time (e.g., 10 to 12 minutes) in boiling water in order to hydrate and gelatinize the starch to provide a cooked product.

Substantial effort has been directed to the development of pre-cooked pasta products, as exemplified by U.S. Pat. Nos. 3,671,264; 3,537,862; 4,044,165; 3,846,563; 3,138,462; 4,098,906; 3,192,049; 3,892,874; 3,600,192; 2,677,613; 3,495,989; 3,251,694; 3,352,686; 3,484,251; 2,768,086; 3,482,993 and 3,728,130. Despite such development efforts, however, there are various disadvantages in conventional pre-cooked pasta products and manufacturing processes for such products, and improved pasta products and processes would be desirable.

Basic processes for manufacturing precooked pasta products in continuous extrusion apparatus utilizing a high temperature zone and a pasta forming extrusion zone have been developed, as described in copending application Ser. No. 323,723 filed Nov. 23, 1981, now U.S. Pat. No. 4,423,082 and assigned to the assignee of the present invention. Such methods provide for rapid manufacture of pasta products without product deformation on drying or the necessity for delicate or extended drying procedures to avoid product checking or cracking. However, improved methods for continuous extrusion for manufacture of precooked pasta products which meet the Standards of Identity of the Food and Drug Administration for Macaroni and Noodle Products, as well as improved imitation pasta products would be desirable.

Accordingly, it is an object of the present invention to provide improved methods for continuously manufacturing quick cooking pasta products which may be readily rehydrated with hot water to provide a fully cooked pasta product of high quality. It is another object of the present invention to provide such processes in which the pasta product components are subjected to uniform and homogeneous processing conditions during manufacture to provide dry pasta product of high uniformity and physical integrity. It is a further object to provide such methods which are rapid and efficient in operation and energy utilization. It is a further object to provide readily controllable methods for manufacturing quick cooking pasta products having desirable storage, cooking and mouthfeel characteristics.

These and other objects of the invention will be more particularly described in the following detailed description and accompanying drawings, of which:

FIG. 1 is a schematic cross sectional view of quick cooking pasta manufacturing apparatus, including a corotating twin screw extruder, which may be utilized in carrying out an embodiment of the present invention; and FIG. 2 is a semischematic view of one of the corotating twin screws of the extruder apparatus of FIG. 1, having a plurality of high temperature backmixing zones together with a graphical representation of internal temperature and pressure profile along the extrusion zone, and FIG. 3 is a semischematic view of one of a corotating screw pair of different design configuration from that of FIG. 2, shown at the same scale as FIG. 2 and in alignment therewith.

Generally in accordance with the present invention, precooked pasta such as macaroni, noodles or the like are manufactured in a continuous extrusion process under particular processing conditions, which include forcing the pasta dough components through a first enclosed pumping zone of increasing pressure and temperature, forcing past a components which have been passed through said first zone back toward said first zone under conditions of intense mixing and shear to provide a first backmixing zone having a local pressure maximum, and continuously withdrawing a uniformly mixed pasta dough from said backmixing zone. The uniformly mixed pasta dough, which has passed through the first backmixing zone is conveyed from the first backmixing zone and is further forced at elevated gelatinization temperature through a second pumping zone of increasing pressure and pasta components which have passed through the second pumping zone are forced back toward the second pumping zone under conditions of intense mixing shear to provide a second backmixing zone having local pressure maximum. The fully gelatinized pasta dough from the second backmixing zone is further forced into a zone of increasing pressure and decreasing temperature, and may be subsequently extruded, cut and dried as will be further discussed. The various extrusion processing zones may be provided by means of a twin screw extrusion cooking apparatus having a specified screw configuration, as will also be more fully discussed.

As indicated, in accordance with various method aspects of the present invention, a substantially completely gelatinized pasta dough is continuously and progressively formed in a high temperature, high shear cooking zone, having at least one back mixing subzone. In this regard, water and cereal flour may be introduced in appropriate proportions into a flighted intermeshing twin screw compression zone and pumped at progressively increasing temperature to a pressure of at least about 5 psig to a counter-flighted mixing zone which functions to pump a portion of the pasta dough, which has been conducted through the compression zone in a countercurrent manner, to generate a relatively high pressure back mixing zone. The pressure should be sufficient to maintain the water as a liquid, and in this regard, the pressure will increase as the temperature of the dough increases above the atmospheric boiling temperature of water, upon progressing through the zone. In this manner, the pasta dough is subjected to intensive back mixing in the high pressure backmixing zone to provide a gelatinized dough mixture having a water content in the range of from about 25 to about 50 percent by weight of the total mixture. A subsequent high temperature backmixing zone may desirably be established in the twin screw processing system in a similar manner which further provides an intermediate high temperature mixing zone between the backmixing zones. The uniformly mixed cereal dough should be maintained at an elevated temperature in the range of from about 235° F. to 350° F. under pressure for a sufficient period of time in the range of from about 15 to about 100 seconds to gelatinize the starch component of the cereal dough composition and form a fully gelatinized pasta dough, and such processing may be carried out in a relatively controlled manner by providing a plurality of high temperature backmixing zones as previously described. The gelatizined pasta dough is subsequently conveyed from the backmixing zone(s) into a cooling-forming extrusion zone of progressively increasing pressure and is progressively cooled to a temperature in the range of from about 130° F. to below the boiling temperature of water at ambient atmospheric conditions. The gelatinized pasta dough formed in the high shear, high temperature zone(s) is progressively conveyed and cooled under progressively increasing pressure and is extruded at a temperature in the range of from about 120° F. to about 200° F. at an extrusion pressure of at least about 400 psig and preferably from about 400 psig to about 1000 psig through shaped openings, and may subsequently be dried to provide a precooked pasta product. The extrusion product may be dried at a temperature in the range of from about 130° F. to about 250° F. or more to rapidly reduce the moisture content thereof to provide dried pasta product having a moisture content in the range of from 6 to 13% by weight of the total weight of the product.

In the formation of the gelatinized pasta dough in the high temperature pumping and back mixing zones, a uniformly mixed cereal composition is blended with water to provide a pasta dough blend having a water content in the range of from about 25 to about 50 percent by weight of water based upon the total weight of the pasta dough blend. Desirably, the water blended with the cereal composition will have a temperature of at least about 90° F., and preferably at least about 110° F. Saturated steam may be introduced into the dough component in the first enclosed pumping zone or subsequent zones to provide water and caloric input but is not necessary in the operation of the present method.

It is an important feature that in the formation of the gelatinized pasta dough, that the substantially uniform dough mixture conveyed through the backmixing zones is subjected to shearing conditions at elevated pressures and temperatures substantially above the gelatinization temperatures of starches in the cereal composition of the pasta dough. In this regard, it is desirable that the pasta dough components be subjected to mechanical mixing work of at least about 0.017 kilowatt hours per pound of gelatinized dough conducted through the backmixing zones and preferably in the range of from about 0.020 to about 0.040 kilowatt hours per hour per pound of gelatinized pasta dough conducted through the backmixing zones in accordance with the method. The mechanical shear in the back mixing zone is carried out at elevated temperatures and pressures, and in this regard, the pasta dough should be subjected to substantial mechanical shear and mixing in the backmixing zones and intermediate high temperature compression zone at a temperature in the range of from about 235° F. to about 350° F. and under a pressure in the range of about 5 to about 150 pounds per square inch gauge for a suitable, limited period of time to provide a homogeneous, completely gelatinized pasta dough, which is subsequently conveyed therefrom to a cooling-extrusion compression zone. The dough product transported from the high temperature backmixing zones must be substantially fully gelatinized. In this regard, by "fully gelatinized" is meant that the starch components of the gelatinized dough product of the first zone should be at least about 95 weight percent, based on the total weight of the starch components, are gelatinized. By gelatinized is meant the complete swelling in water of all starch granules and complete cell collapse in an irreversible fashion. Fully gelatinized starch loses its crystallinity, and the loss of crystallinity (e.g., as determined by cross-polarized light microscopy) is a conveniently measured determinant of full gelatinization.

The gelatinized pasta dough blend from the first, high temperature extrusion zone is subsequently introduced at a relatively high temperature into a cooling extrusion and compression zone which pressurizes and cools the gelatinous pasta dough to an extrusion temperature which will desirably be in the range of from about 120° F. to about 200° F. to provide a conditioned pasta extrusion dough. The conditioned pasta extrusion dough is extruded from the cooling-compression zone through suitable openings which may be of conventional design, to provide a desired pasta product cross section, at pressures in the range of from about 400 to about 1000 psig (depending upon moisture content of dough and flow rate), at the die face to form a conditioned gelatinized pasta product. The gelatinized pasta dough introduced into the cooling-compression zone from the high temperature back mixing zone or zones should have a moisture content in the range of from about 20 to about 50 percent by weight, and preferably in the range of from about 25 to about 35 percent based on the total weight of the pasta dough.

The dough is subjected to progressive cooling in the cooling - compression zone to an extrusion temperature in the range of, for example, 120° F.–200° F., and the extruded, gelatinized, formed conditioned pasta is cut upon extrusion to form hydrated pasta pieces which may be subsequently subjected to provide a dried, precooked pasta product which will rapidly rehydrate in hot water. In this regard, the cut hydrated pasta product may be rapidly dried at a temperature of from 130° F. to 250° F. or more.

In accordance with a preferred embodiment of this invention, the farinaceous ingredients of the present invention may be provided by a product based completely upon wheat flour. When desired, however, wheat flour can be replaced by other farinaceous substances, such as durum, farina, semolina, corn flour, tapioca flour, or potato flour, or mixtures thereof. Other optional pasta ingredients such as salt for flavoring purposes, and egg yolk solids or whole egg solids where egg noodle products are desired, can be incorporated as pasta dough components. Soy flour, milk, wheat gluten, disodium phosphate, salt, spices, comminuted vegetables and meats, vegetable oil, shortening, leavening agents, mineral and vitamin enrichment, natural and artificial coloring agents, and natural and artificial flavoring agents may be used in moderate amounts to season, strengthen, fortify, color or flavor the product of this invention as is known in the art. Extrusion aids such as surfactants and emulsifiers are desirable components of the pasta blend. For example, lecithin, mono and diglycerides, sodium stearyl-2-lactylate, propylene glycol, glyceryl and sorbitan stearates and polysorbates may be used in the dough compositions as extrusion aids.

As indicated, in accordance with the method, the temperature of cereal flour and added water is rapidly elevated under pressure to cooking temperatures of 235° F. to 350° F. This heating may be carried out by a combination of barrel heating and mechanical shear, particularly in the high temperature backmixing zones during the period when the flour and water are forming a uniform dough. The elevated temperature is maintained for a relatively short time period in the range of from about 15 to 100 seconds, following which the dough is conducted to a second cooling extrusion zone where the gelatinized dough composition is progressively transported into a zone of increasing pressure and cooled therein. In this regard, the dough is cooled to a temperature below 212° F. and extruded through a suitable die at elevated pressure and temperature below about 212° F. to form conventional pasta shapes.

The rapid cooking results in a product which hydrates rapidly, has an excellent mouthfeel, and maintains product integrity for an extended period. The purpose of cooling gelatinized dough in the cooling-compression zone is to prevent expansion of the extruded pasta pieces by evaporation of the water in the dough, and to provide a conditioned dough of high uniformity which may be extruded to form a dense, homogeneous, gelatinized pasta product that may be rapidly dried. Upon drying, a dried, precooked pasta product is provided which may be rapidly rehydrated in hot water, and which maintains its physical integrity for a substantial period of time under such conditions.

Turning now to the drawings, various aspects of the present invention will be more particularly described with reference to the twin screw extruder pasta manufacturing line 10 illustrated in FIG. 1. As illustrated in FIG. 1, the line 10 comprises a twin screw cooking extruder 100 such as Model ZDK-57 twin screw extruder of Werner & Pfleiderer Corporation having a particular screw configuration and temperature control system as will be described more fully hereinafter.

The cooking extruder 100 is comprised of a plurality of ten segmented barrel sections 201 through 210 each having a length of about 180 mm, which together form a barrel 102 enclosing two continuous, intermeshing screw flights 198, 200 which terminate at a pasta die extrusion face 104. The screw flights 198, 200 are of substantially identical construction and adapted to intermesh with each other in a corotating manner. A plurality of screw flight assembly units are utilized to form screw flight sections having various purposes which govern and control the pasta manufacturing process together with other control parameters, as will be more fully described.

The barrel 102 is divided into four separate temperature control zones 301-304. Zone 301 comprises barrel segments 201 and 202, and is provided with encircling electrical resistance heating bands under control of a thermal sensory circuit which maintains a constant, predetermined temperature in barrel segments 201 and 202.

Similarly, barrel zone 302 comprises barrel segments 204 and 205, which are provided with electrical resistance heating bands under the control of a separate temperature controller circuit. Zone 303 comprises barrel subunits 206 and 207, which similarly comprise electrical resistance heating elements under separate temperature control. In a similar manner, zone 304 comprises jacketed barrel subunits 208, 209 which are provided with cooling water jackets 120 under separate temperature control of the zone 304 temperature controller.

In operation, a cereal composition is placed in a feed hopper 108 from which it is transported into the barrel 102 by means of a vibratory feeder 106. Hot water via inlet 110 is also metered into the barrel 102 to provide the desired pasta composition with the desired moisture content. The combined effects of mixing, mechanical shear, and the sequence of cooking and cooling processing steps within the extruder barrel 102 as the pasta composition traverses the extruder system 100 provides a fully gelatinized pasta dough at the die face 104. Upon extrusion, the cooked and cooled extrudate discharging through the pasta extrusion die face 104 is compressed and formed into the desired shapes. In this regard, the fully gelatinized dough is heated, cooked and mixed in the barrel segments of zones 301, 302, 303 and is subsequently transported through water jacketed cooling zones 304 of the extruder prior to extrusion and pasta formation. As the dough is fed into the terminal cooling sections 208-210, it is progressively cooled while being conducted along the barrel of the extruder which is provided with water jackets to cool the dough. The mixing action of the twin screw flights provides for rapid heat transfer from the dough and precise temperature control. As it is transported along the cooling section, the dough is cooled under conditions of progressively increasing pressure, and is extruded from suitable extrusion orifices in the die face 104. The twin flights of the twin screw extruder 102 are approximately 1800 millimeters long from the input orifice to the screw flight termination point at the extruder face 104. The rotating twin screw flights operate at a speed in the range of from about 200 rpm to about 300 rpm. Generally, the dough may be subjected to processing within the twin screw extrusion system 100 for a time period in the range of from about 60 seconds to about 120 seconds. Relatively high extrusion pressures in the range of from about 400 to about 1000 psig may be used, and suitable extrusion dies may be used to produce desired pasta shapes in accordance with conventional procedures in the art. By virtue of the interaction of the corotating screw flights 200 of the extruder 102, the pasta material has a relatively small distribution of residence time within the extruder. In this regard, the pasta material passes relatively continuously through the extruder system 102, and there is a relatively small deviation of residence time from the mean residence time of the pasta dough components within the barrel. Thus, all of the material processed through the extrusion system 100 has substantially the same processing treatment.

Illustrated in FIG. 2 is the schematic representation of the screw element configuration of corotating twin screw 200 illustrating the plurality of different screw sections which are adapted to perform various functions in the processing of the pasta dough component in accordance with the present method, while maintaining the conjugation of the screw 200 with like screw 198 along at least a portion of the screw length.

As shown in FIG. 2, which illustrates in relative linear longitudinal scale the screw 200 together with reference lines representing the physical boundaries of the barrel segments 201-210, the screw comprises a plurality of functional sections generally constructed of conveying screw sections, mixing sections and backmixing sections. In this regard, the proximate end of the screw 200 to the barrel feed input comprises an initial conveying segment 212 of "right handed" conveying screw sections which extends throughout barrel segment 201 and into barrel segment 202. Conveying screw sections utilized a two flighted profile with deep screw flights which result in more free volume per unit length and low shear rater. Conveying screws provide good feed intake for the low bulk feed density dough components and provide sufficient conveying action to move the material through the extruder. In the illustrated embodiment, Werner & Pfleiderer model 60/60 and 80/80 conveying screw segments are used. The initial numerical designation for the conveying screw sections indicates the screw pitch angle, and the second numerical designation indicates the length of the segment in millimeters. In the illustrated embodiment, the conveying screw section may be made up of one 60/60 section followed by two 80/80 segments followed by another 60/60 segment.

A zone of mixing block segments 214 extends from barrel zone 202 into barrel zone 203. By "mixing block segment" is meant a processing section designed to provide high shear intensive mixing action to mix the ingredients with water to form a dough. In the illustrated embodiment 10, Werner & Pfleiderer model 30/60-7 and 90/50-5 mixing block segments are used. In the mixing block designation, the second number (i.e., 60) indicates the length of the segment in millimeters, the third number (i.e., 7) indicates the number of subsegments, and the initial number (i.e., 30) indicates the degree of angular rotation about the screw axis between adjacent subsegment elements. In the illustrated embodiment, the mixing block section may comprise two 30/60-7 mixing block segments followed by one 90/50-5 mixing block segment.

The mixing block section 214 is followed by a relatively short backmixing segment 216 containing left handed mixing blocks. By "back-mixing segment" is meant an extrusion flight element designed to slow down or restrain the forward movement of the dough to allow the preceding segment to fill up to obtain more intense mixing. Back mixing segments may pump at least a portion of the dough in a backward direction. In the illustrated embodiment, a Werner & Pfleiderer model 30/40-4 backmixing segment may be used. The number designation is the same as that previously described for the mixing block segments.

A short conveying segment 218 extends from the backmixing segment 216 to the end of barrel segment 203. A relatively long mixing block segment 220 extends through barrel segment 204 and most of barrel segment 205, which in turn is adjacent a second backmixing segment 222. Barrel segments 206-210 contain a plurality of alternative mixing blocks 224, 228, 232, 236, 240 and conveying segments 226, 230, 234, 238, 242 a shown in FIG. 2.

Having generally described the physical configuration of screw 200 and the extruder barrel, processing of the pasta dough component will now be more fully described.

In barrel section 102, flour and tap water are fed into the twin screw extruder 100. Screws 200 are corotating screws serving to convey, mix heat and compress the dough. The rate of pasta component processing by the extruder 100 is determined by the amount of dough components metered into the feed orifice 106. A vibrating feeder may be used for this purpose. The quantity of pasta components introduced into the extruder 100 is generally smaller than the output capacity of the extruder 100, and the intial flight section is generally incompletely filled with pasta components in respect to its total volume capacity. Pasta components are reduced in bulk density by the action of the twin screw extruder, and the screw segment 212 within input barrel feed section 201 may have a pitch and flight-tip width chosen to provide relatively large channel volume and mixing capability to mix and equalize feed variations while continuously conveying the pasta dough components from the feed opening into the barrel 102.

The pumping action of the conveying screw segment 212 forces the pasta components to the subsequent mixing block segment 214 of the screws.

Until the conveying action of the conveying screw segment 212 builds up pressure in the barrel, screw flights merely convey and mix the dough components without substantially working the dough, the flights are not substantially filled, only a very limited amount of mechanical energy is transferred to the dough components through shear, and the dough components do not contact the full inside surface of the barrel 102, thus reducing the heat transferred to it from the outside heater bands of the heating zone 301. When the screw flights are more substantially filled, however, power is dissipated as heat into the pasta dough, and the dough is more fully and continuously mixed and brought into contact with the continuous barrel interior surface.

In corotating twin-screw extruders, mechanical shear is substantially lower than in comparable single-screw extruders because the length of the filled screw is shorter, the flight channels are deeper and the screws rotate at a substantially lower speed. To provide for thorough mixing and to provide a uniform and increased mechanical shear input to the dough components, mixing block segment 214 and backmixing segment 216 are provided.

In barrel segments 202, 203, shear supplied by mixing block segment 214 mixes the flour and water while subjecting the dough mixture to intense heating conditions from the mechanical working of the dough by the mixing blocks, and from the continuously shearing contact with the heated interior surface of the barrel of heating zone 301. The left handed backmixing blocks 216 in barrel segment 203 force retention of the ingredients in barrel 102, thereby tending to fill the flights of the right handed conveying segment 212 and mixing blocks 214 which mix the flour and water.

Mixing of the dough components is completed in barrel segment 203. The shear creates friction which together with the heated interior barrel surface brings the temperature of the dough components up to a maximum. A conveying screw 218 provides the push to keep the heated dough moving into subsequent processing zones. Zone 301 barrel heaters only provide a minimum of heat to the product, and the major component of the heat input is from mechanical shear.

In order to process the dough, it is important that substantial pressure be built up along the conveying and mixing flights 212, 214 of the twin screw extruder 100 so that the flights can be sufficiently filled that shear as well as heat can be applied to it. In this regard, the backmixing segment 218 restrains the dough which is forced forward by the previous sections 212 and 214. In this manner, a zone of relatively high pressure is formed where the pumping forces converge, and a plurality of flights of the pumping and mixing sections 212, 214 tend to be filled in order to create that pressure. The back mixing segment 218 may be a counter-flighted section having slots to permit the material to be conveyed toward the discharge end of the extruder under uniform shear conditions while maintaining a reverse pumping function.

The high pressure zone around the screws at the zone of intersection between direct and reverse flighted sections 212, 214, 216 creates a seal that impedes the flow of gases, such as water vapor, backward toward the feed opening, and accordingly provides for heating the pasta dough at temperatures exceeding the boiling point of water.

Moreover, through provision of the backmixing segment 216 (and 222), it will be appreciated that pressure peaks and desired treatment zones are accurately established in desired positions along the barrel 102.

A second counter-flighted backmixing section 222 is placed farther down the barrel. The two backmixing sections 216, 222 create two realtively high pressure backmixing zones with an intermediate zone in which the pressure is lower.

Barrel segment 205 contains only mixing block 220 which continues to supply shear necessary to maintain the dough temperature. The left handed backmixing blocks 222 in barrel segment 205 retain the dough in barrel segment 205 in a manner similar to that described with respect to backmixing blocks 216. This creates an extended mixing zone in barrel segments 204, 205 which continues to cook the pasta and to gelatinize the starch.

As indicated, barrel 205 contains mixing blocks 220 with no conveyance screws, and with another left handed mixing block, the dough continues to accumulate in the barrel 102, thereby filling the flights and providing for increased shear and contact with the heated interior wall surface of the barrel. The shear continues to maintain the temperature, with zone 302 barrel heaters only providing a minimum of heat to the product.

In barrel segment 206, more conveyance screws are provided to reduce the amount of material in the barrel. The temperature of the fully gelatinized pasta dough from the previous barrel segment 205 is reduced as a result of using fewer mixing blocks, and the cooling effect of wall contact.

The same ratio of mixing blocks to conveyance screw flights as used in barrel segment 206 is used in barrel segment 207, which is also under control of the zone 303 temperature control system. A further drop in temperature results. There is no change in the amount of material in the barrel.

In barrel segment 208, a combination of mixing blocks 236 and conveyance screws 234, 238 as shown in FIG. 2 are used to increase the heat transfer. With cooling water flowing through the barrel segment 208, the dough is cooled and conveyed. The material continues to accumulate in the barrel as cooling proceeds.

In barrel segment 209, cooling continues using a similar combination of mixing blocks and conveyance screws, and a pressure build-up is provided to force material through the die 104.

In barrel segment 210, cooling water also flows through the barrel segment to cool the interior wall of the barrel. A pressure build-up occurs in the completely filled barrel segment. The shear generates a slight temperature increase. Maximum pressure occurs in this barrel just in front of the die 104.

In passage through the extruder barrel 102, the flour and water are mixed and heated immediately to a temperature above 212° F. At least this minimum temperature is maintained as the material passes through the heating zones 301 and 302. This is followed by cooling in zone 304 and the remaining barrel segment 210 prior to exiting the extruder, to prevent expansion of the dough product upon extrusion.

As the dough is fed into the cooling sections 208, 209, the dough is progressively cooled while being conducted along the barrel of the extruder, which is provided with water jackets 120 to cool the dough. As it is transported down the cooling section, the dough is desirably cooled under conditions of progressively increasing pressure to a temperature in the range of from about 120 to about 200° F. After being transported along the cooling extruder cylinder, the dough is extruded from the cooling extruder through die 104 at a pressure of up to 1500 psig in desired pasta shapes as are known in the art.

The extruded pasta is cut at the die face 104, and after cutting, the pasta pieces may fall from the die onto a conveyor belt to be carried through a continuous dryer of appropriate design. The pasta pieces may be dried at ambient temperatures or may be subjected to forced hot air drying temperatures of, for example, from about 130° F. to about 250° F.

A cereal mixture composed of 100 pounds of durum flour and one pound of concentrated glyceryl monostearate containing a minimum of 90% total monoesters is filled into the feed hopper of a model ZDK-57 twin screw cooking extruder manufactured by Werner & Pfleiderer Masch. Fabr., as schematically illustrated in FIG. 1. At the entrance of the extruder hot water is introduced to the cereal composition. Thermocouple temperature readings are taken at positions along the barrel, as indicated in FIG. 2.

The dough was extruded from the extruder through a teflon lined pin and wall die with a pin diameter of a 0.104" and outside diameter of 0.140". This gives a nominal product wall thickness of 0.018".

As the dough was released through the die, the dough was cut by a rotating flexible knife held under compression at an angle against the plate face of the die.

A series of four runs (runs 2–5) utilizing the equipment and pasta components as described hereinabove is conducted to investigate heat and material balance, different screw configurations and operating conditions in the manufacture of precooked pasta products. The results are set forth in the following Table, and in the accompanying graph of FIG. 2. For comparison, an additional run (run 1) is made utilizing a screw 300 having only a single backmixing zone. The temperature measurements were made by thermocouple measurement at the respectively indicated positions along the extruder barrel as shown in FIG. 2, and the pressure reading was made at the extrusion die at the position indicated on FIG. 2. The temperature measurements of the respective extruder zones reflect electrically heated barrel temperature, and are determined by J type thermocouples located in thermocouple wells along the barrel.

TABLE

| Run | 1 | 2 | 3 | 4 | 5 |
|---|---|---|---|---|---|
| Jacket Temp. Set/Actual (°F.) | | | | | |
| Zone 301 | 320/277 | 248/266 | 266/252 | 266/248 | 266/252 |
| Zone 302 | 428/423 | 248/243 | 140/271 | 140/277 | 291/286 |
| Zone 303 | 348/341 | 212/225 | 230/257 | 230/252 | 230/257 |
| Zone 304 | Off/126 | Off/153 | Off/156 | Off/154 | Off/158 |
| Product Temperature | | | | | |
| T14 (°F.) | 276 | 217 | 228 | 225 | 231 |
| T13 (°F.) | 275 | 206 | 218 | 219 | 226 |

TABLE-continued

| Run | 1 | 2 | 3 | 4 | 5 |
|---|---|---|---|---|---|
| T12 (°F.) | 238 | 211 | 215 | 210 | 221 |
| T11 (°F.) | 136 | 163 | 162 | 173 | 169 |
| T10 (°F.) | 174 | 166 | 166 | 169 | 171 |
| Flour Rate (lbs/hour) | 200 | 300 | 325 | 325 | 325 |
| Water Rate (lbs/hour) | 103 | 118 | 112 | 135 | 109 |
| Moisture (weight %) | 31.0 | 32.7 | 30.3 | 32.5 | 30.5 |
| % Motor Load | 66 | 95 | 102 | 96 | 100 |
| Barrels at 212° F. or above | 5⅛ | 1⅝ | 4⅝ | 4⅛ | 5¼ |
| Die Pressure (psig) | 750 | 500 | 620 | 550 | 600 |
| Screw configuration | 300 | 200 | 200 | 200 | 200 |
| RPM of Screws | 250 | 250 | 250 | 250 | 250 |
| Product | Poor | Poor | Excell | Excell | Excell |

Accordingly, it will be appreciated that in accordance with the present invention, improved methods for the manufacture of precooked pasta products have been provided. While the present invention has been described with specificity with respect to particular embodiments, various modifications and adaptations thereof will become apparent based on the present disclosure, and are intended to be within the spirit and scope if the present invention.

Various features of the present invention are set forth in the following claims.

What is claimed is:

1. A method for preparing dense, homogeneous precooked pasta products which may be rapidly rehydrated in water comprising the steps of continuously combining pasta dough components comprising water and a dry cereal flour in a flighted, intermeshing, corotating twin screw compression zone to provide a pasta cereal dough mixture having a water content in the range of from about 25 to about 50 percent by weight of the total mixture;

conveying and forcing the pasta dough components through a first enclosed intermeshing, corotating twin screw pumping zone of increasing pressure and temperature, forcing said pasta components which have passed through said first zone back toward said first zone under conditions of intense mixing and shear to provide a first backmixing zone having a local pressure maximum; continuously withdrawing a uniformly mixed pasta dough from said first backmixing zone, conveying and forcing the uniformly mixed pasta dough which has passed through the first backmixing zone at elevated gelatinization temperature through a second enclosed intermeshing, corotating twin screw pumping zone of increasing pressure, forcing pasta dough components which have passed through said second pumping zone under conditions of intense mixing and shear to provide a second backmixing zone having local pressure maximum, whereby said cereal dough mixture is rapidly heated above the atmospheric gelatinization temperatures of starches in the cereal composition maintaining the cereal dough at an elevated temperature of 235° F. to about 350° F. under pressure within said first and second enclosed pumping zones while for a sufficient period of time in the range of from about 15 to about 100 seconds to fully gelatinize the starch component of the pasta composition;

conveying and forcing a fully gelatinized pasta dough from the second backmixing zone into a flighted, intermeshing corotating twin screw compression zone of increasing pressure and decreasing temperature wherein the fully gelatinized dough is cooled to a temperature in the range of from about 130? F. to below the boiling temperature of water to provide a pressurized, conditioned pasta extrusion dough, and extruding the cooled, conditioned, fully gelatinized pasta extrusion dough at a pressure in the range of from about 400 psig to about 1000 psig through a die to form a dense, homogeneous fully gelatinized pasta product having an extruded pasta shape and continuously drying the shaped fully gelatinized pasta product at a temperature of at least about 130° F. to provide a dried, precooked pasta product which readily rehydrates in hot water.

2. A method as recited in claim 1 wherein said pasta cereal dough mixture comprises glyceryl monostearate, disodium phosphate and a farinaceous substance selected from the group consisting of farina, durum, semolina, corn flour, potato flour, tapioca flour and wheat flour.

3. A method as recited in claim 1 wherein said pasta cereal dough mixture contains glyceryl monostearate, dried egg yolk, and a farinaceous substance selected from the group consisting of farina, durum, semolina, corn flour, potato flour, tapioca flour and wheat flour.

4. A method as recited in claim 1 wherein said pasta cereal dough mixture contains glyceryl monostearate, dried whole egg, and a farinaceous substance selected from the group consisting of farina, durum, semolina, corn flour, potato flour, tapioca flour and wheat flour.

5. A method as recited in claim 1 wherein said pasta cereal dough mixture contains glyceryl monostearate and a farinaceous substance selected from the group consisting of farina, durum, semolina, corn flour, potato flour, tapioca flour and wheat flour.

6. A method as recited in claim 1 wherein the pasta dough components are subjected to mechanical mixing work in the range of from about 0.02 to about 0.04 kilowatt hours per pound of gelatinized pasta dough conducted through the backmixing zones.

7. A method as recited in claim 1 wherein said conditioned pasta extrusion dough is progressively cooled to a temperature in the range of from about 120° F. to about 200° F. prior to extrusion.

8. A method as recited in claim 1 wherein said dried pasta product has a moisture content in the range of from about 6 to about 13 percent by weight based on the total weight of the dried product.

9. A method as recited in claim 1 wherein said pasta dough is maintained at elevated pressure in said first and second backmixing zones and in the pumping zone intermediate said first and second backmixing zones.

* * * * *